(12) United States Patent
Kalkunte

(10) Patent No.: US 9,509,636 B2
(45) Date of Patent: Nov. 29, 2016

(54) MULTICAST TRAFFIC MANAGEMENT WITHIN A WIRELESS MESH NETWORK

(71) Applicant: Vivint, Inc., Provo, UT (US)

(72) Inventor: Venkat Kalkunte, Saratoga, CA (US)

(73) Assignee: Vivint, Inc., Provo, UT (US)

( * ) Notice: Subject to any disclaimer, the term of this patent is extended or adjusted under 35 U.S.C. 154(b) by 229 days.

(21) Appl. No.: 14/207,011

(22) Filed: Mar. 12, 2014

(65) Prior Publication Data

US 2014/0269487 A1  Sep. 18, 2014

Related U.S. Application Data

(60) Provisional application No. 61/794,968, filed on Mar. 15, 2013.

(51) Int. Cl.
*H04L 12/931* (2013.01)
*H04W 4/06* (2009.01)

(52) U.S. Cl.
CPC ............. *H04L 49/201* (2013.01); *H04W 4/06* (2013.01)

(58) Field of Classification Search
CPC ....... H04L 45/12; H04L 45/16; H04W 24/00
See application file for complete search history.

(56) References Cited

U.S. PATENT DOCUMENTS

| | | | |
|---|---|---|---|
| 7,269,157 B2 | 9/2007 | Klinker et al. | |
| 8,248,949 B2 | 8/2012 | Ozer et al. | |
| 8,284,775 B2 | 10/2012 | Chu et al. | |
| 8,516,117 B2 | 8/2013 | Munger et al. | |
| 8,885,519 B2 * | 11/2014 | Aguirre ................ | H04L 45/122 370/255 |
| 2005/0036500 A1 * | 2/2005 | Rodeheffer ........... | H04L 12/462 370/401 |
| 2006/0039385 A1 * | 2/2006 | Bare ...................... | H04L 12/18 370/400 |
| 2008/0095059 A1 | 4/2008 | Chu | |
| 2008/0095163 A1 * | 4/2008 | Chen ...................... | H04L 45/16 370/392 |
| 2008/0137556 A1 | 6/2008 | Park et al. | |
| 2009/0003207 A1 | 1/2009 | Elliott | |
| 2010/0008261 A1 | 1/2010 | Javaid et al. | |
| 2010/0074141 A1 | 3/2010 | Nguyen | |
| 2010/0228980 A1 | 9/2010 | Falk et al. | |
| 2011/0280123 A1 | 11/2011 | Wijnands et al. | |
| 2012/0008527 A1 * | 1/2012 | Le ......................... | H04W 48/08 370/254 |

(Continued)

FOREIGN PATENT DOCUMENTS

KR    1020100042516    4/2010

OTHER PUBLICATIONS

International Search Report for PCT/US2014/024846. Apr. 12, 2014.

(Continued)

*Primary Examiner* — Shaq Taha
(74) *Attorney, Agent, or Firm* — Holland & Hart LLP

(57) ABSTRACT

The present disclosure relates to a management of multicast traffic within a wireless mesh network. In some embodiments, a wireless mesh network includes a plurality of mesh nodes and a central server in communication with at least one of the mesh nodes of the plurality of mesh nodes. In some embodiments, the central server is configured to generate one or more rules for at least one of the mesh nodes to enable a change in a pre-routing parameter in a packet header. In some embodiments, the central server includes a rules-based engine configured to generate and convey one or more traffic shaping rules in response to sensing traffic conditions.

16 Claims, 3 Drawing Sheets

(56) References Cited

U.S. PATENT DOCUMENTS

| | | | |
|---|---|---|---|
| 2012/0110537 A1* | 5/2012 | Vedantam | G06F 17/5077 716/129 |
| 2013/0121331 A1 | 5/2013 | Vasseur et al. | |
| 2013/0170335 A1* | 7/2013 | Pace | H04W 40/00 370/218 |
| 2013/0188562 A1* | 7/2013 | Espina Perez | H04L 1/188 370/328 |
| 2013/0272217 A1 | 10/2013 | Negus et al. | |
| 2015/0188808 A1 | 7/2015 | Ghanwani et al. | |
| 2015/0270882 A1 | 9/2015 | Shattil | |

OTHER PUBLICATIONS

English machine translation of KR1020100042516. Apr. 26, 2010.
International Search Report and Written Opinion of the International Searching Authority for PCT/US2015/019735, issued May 28, 2015.

* cited by examiner

MULTICAST TRAFFIC MANAGEMENT WITHIN A WIRELESS MESH NETWORK

CROSS REFERENCES

The present application claims priority to U.S. Provisional Patent Application No. 61/794,968, titled: "MULTICAST TRAFFIC MANAGEMENT WITHIN A WIRELESS MESH NETWORK," filed on Mar. 15, 2013, and assigned to the assignee hereof.

TECHNICAL FIELD

This disclosure relates generally to wireless mesh networks, and more particularly to multicast routing within wireless mesh networks.

BACKGROUND

Internet Protocol (IP) multicast is a routing technique that allows IP traffic to be sent from one source or multiple sources and delivered to multiple destinations. Instead of sending individual packets to each destination, a single packet is sent to a multicast group, which is identified by a single IP destination group address. IP multicast routing protocols use a time-to-live (TTL) parameter to decide how "far" from a sending host a given multicast packet should be forwarded (i.e., a number of hops). The default TTL value for multicast within a wireless mesh network is one (1), thus resulting in a multicast packet being forwarded one (1) hop, which may be insufficient.

BRIEF SUMMARY OF THE INVENTION

In a specific embodiment, a wireless mesh network includes a plurality of mesh nodes and a central server in communication with each mesh node of the plurality. The central server may be configured to generate one or more rules for each mesh node of the plurality. The one or more rules may enable a change in a pre-routing parameter in a packet header of a multicast packet received at a mesh node during a multicast operation. More specifically, according to one embodiment, the central server (i.e., network controller) includes a rules-based engine configured to generate one or more rules, for each mesh node of a wireless mesh network, to manage multicast traffic within the wireless mesh network.

Of course, methods of operating a system are also within the scope of the present invention. Such a method may include generating one or more rules for each mesh node of a plurality in one or more wireless mesh routes for managing traffic in a multicast operation, wherein the one or more rules enable a change in a pre-routing parameter of a multicast packet received at a mesh node during a multicast operation. The method may further include conveying the one or more rules to each mesh node of the plurality.

In another specific embodiment, a method may include receiving one or more rules from a central controller at a wireless mesh node. In addition, the method may include modifying a pre-routing parameter of a received multicast packet based on the one or more received rules.

Yet other embodiments of the present invention comprise computer-readable media storage storing instructions that when executed by a processor cause the processor to perform instructions in accordance with one or more embodiments described herein.

Other aspects, as well as features and advantages of various aspects, of the present invention will become apparent to those of skill in the art though consideration of the ensuing description, the accompanying drawings and the appended claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
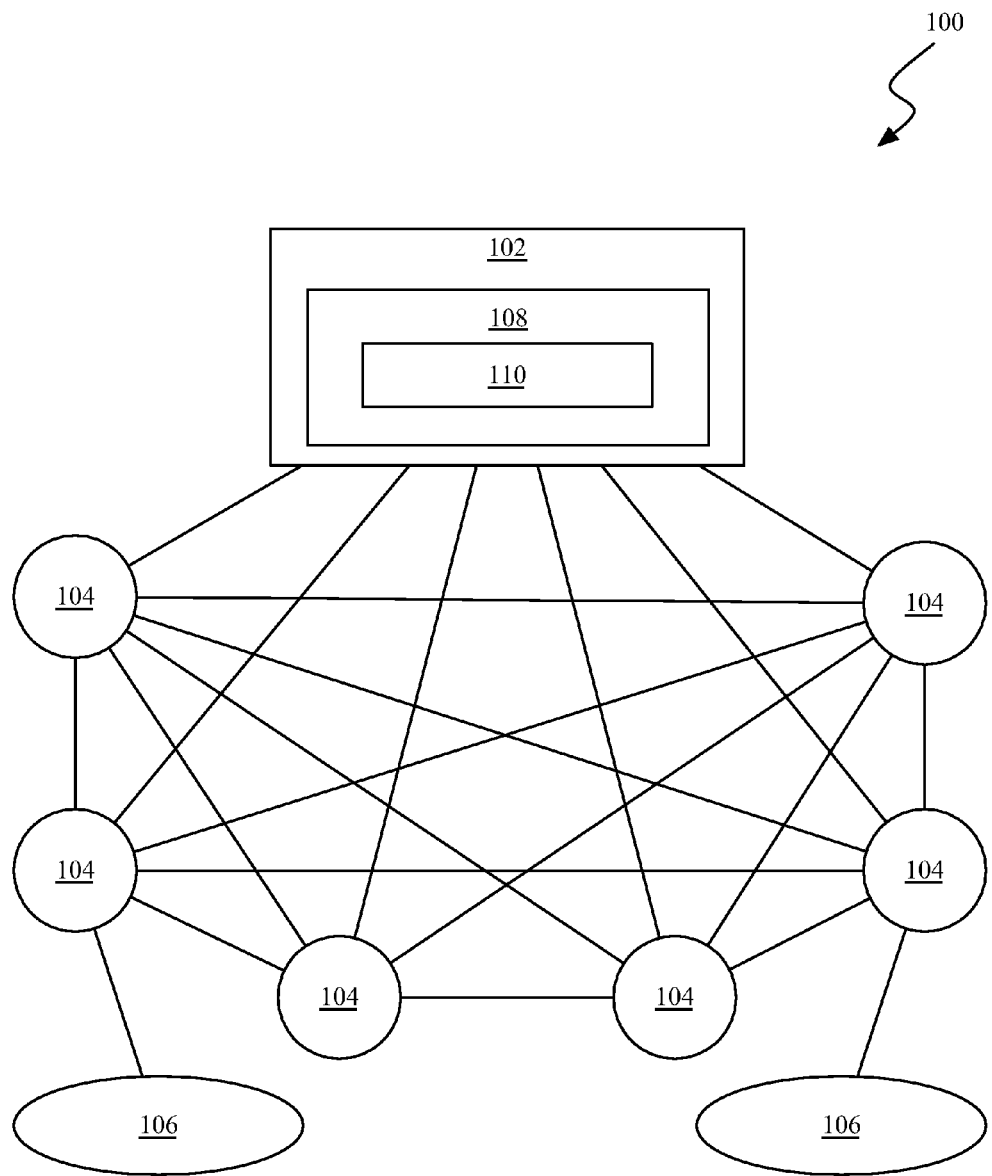
FIG. 1 depicts a wireless mesh network including a plurality of mesh nodes and a central controller, according to an embodiment of the present invention.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Referring in general to the accompanying drawings, various embodiments of the present invention are illustrated to show the structure and methods for installing a component within a system, such as a security system. Common elements of the illustrated embodiments are designated with like numerals. It should be understood that the figures presented are not meant to be illustrative of actual views of any particular portion of the actual device structure, but are merely schematic representations which are employed to more clearly and fully depict embodiments of the invention.

The following provides a more detailed description of the present invention and various representative embodiments thereof. In this description, functions may be shown in block diagram form in order not to obscure the present invention in unnecessary detail. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

In this description, some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

As will be appreciated by a person having ordinary skill in the art, several routing protocols may be used to discover multicast groups and to build routes for each multicast group. These routing protocols may include, for example, Protocol-Independent Multicast (PIM), Distance-Vector Multicast Routing Protocol (DVMRP), Multicast Open Shortest Path First (MOSPF), Internet Group Management Protocol (IGMP), Multicast BGP (MBGP), Multicast Source Discovery Protocol (MSDP), Multicast Listener Discovery (MLD), and GARP Multicast Registration Protocol (GMRP).

The Distance-Vector Multicast Routing Protocol (DVMRP) is based on the routing information protocol and may be found implemented on IP networks where routing protocols to support multicast are absent. DVMRP uses a reverse path flooding approach, transmitting received packets along all paths. It is generally understood that DVMRP suffers from network scaling issues, due in part to the flooding approach in implementations lacking pruning mechanisms. DVMRP's flat unicast routing mechanism also affects its capability to scale. In some DVMRP implementations, routers occasionally re-flood a network based on one or more algorithms, such as those that account for flooding frequency, data stream delivery time, and the like.

Protocol-Independent Multicast (PIM) includes four variant modes of behavior: PIM sparse mode, PIM dense mode, bidirectional PIM, and PIM source-specific multicast, with PIM sparse mode and PIM dense mode being the most commonly implemented. The PIM dense mode uses a process of reverse path flooding that is similar to the DVMRP. Unlike DVMRP, PIM dense mode is not concerned with the presence or absence of any particular unicast protocol determining which interface provides a path back to the data stream source. As the name implies, unlike DVMRP, which uses its own protocol, PIM is protocol independent.

PIM sparse mode is optimized for internetworks with sparsely distributed multicast groups. PIM sparse mode uses multicast distribution trees rooted at a rendezvous point that is then used as a registration point for packet routing. In order to receive multicast data, routers explicitly indicate to their upstream neighbors of their interest in particular groups and particular sources. Routers use PIM Join and Prune messages to join and leave multicast distribution trees. This allows the packets in a given data stream to move from the sender, through the rendezvous point, and ultimately on to the receiver. Routers in the path optimize the number of hops in the path during the multicast.

The Multicast Open Shortest Path First (MOSPF) is an extension of Open Shortest Path First (OSPF). MOSPF generally may facilitate interoperation between unicast and multicast routers, and was designed such that it is generally backwards compatible with non-OSPF unicast routers. In general, MOSPF employs a unicast routing protocol that requires each router in a network to be aware of all available links. A MOSPF router calculates routes from a source to all possible group members for a particular multicast group. MOSPF routers generally include multicast information in OSPF link state advertisements, enabling the router to identify active multicast groups and their associated local area networks. MOSPF routers generate a distribution tree for each multicast source, each group, and each sending source. The routes for each source/multicast group pair are calculated. Each time a link state changes, or if the cache times out, MOSPF will recalculate the topology.

The present invention, as described herein, includes embodiments related to management of multicast traffic within a wireless mesh network. With reference to FIG. 1, a wireless mesh network 100 includes a central server 102 (i.e., a management server), a plurality of mesh nodes 104, and a plurality of destinations 106. Central server 102, which may also be referred to as a "management server" or a "central controller," may include a rules-based engine 108 and may be communicatively coupled to all mesh nodes 104 within wireless mesh network 100. According to one embodiment, rules-based engine 108 may include a multicast daemon 110, as described more fully below.

Central server 102 may be configured to sense traffic (e.g., upon manual or automatic triggers) within mesh network 100 and generate rules for allowing/disallowing decisions. The rules may be sent individually to each mesh node 104 in a routing path. The one or more rules received at a mesh node can be used to change a pre-routing parameter in an IP packet header of a received packet. Thus, a mechanism used by netfilters to decide whether to drop or forward packet is manipulated.

According to one example, the pre-routing parameter may comprise a time-to-live (TTL) parameter. Thus, in this example, a TTL parameter of a multicast may be adjusted at each hop within a routing path of a wireless mesh network according to a set of rules. Since multicast flows between multiple interfaces before reaching a destination, a TTL parameter may be adjusted at each hop. The resulting affect is media players can recognize media servers, even though the media player and media server may exist on separate sub-networks.

Rules-based engine 108 may create one or more rules for forwarding multicast traffic to locations in network 100 where there might be media "consumers". Rules-based engine may be configured to recognize media "producers" and "consumers" and facilitate forwarding of multicast traffic. Once multicast flows can be recognized, the resulting unicast media can be shaped accordingly to meet guarantees. Using a combination of PIM and SMC route, 802.11n mesh based network can derive advantages of IP multicast.

Figure 2:
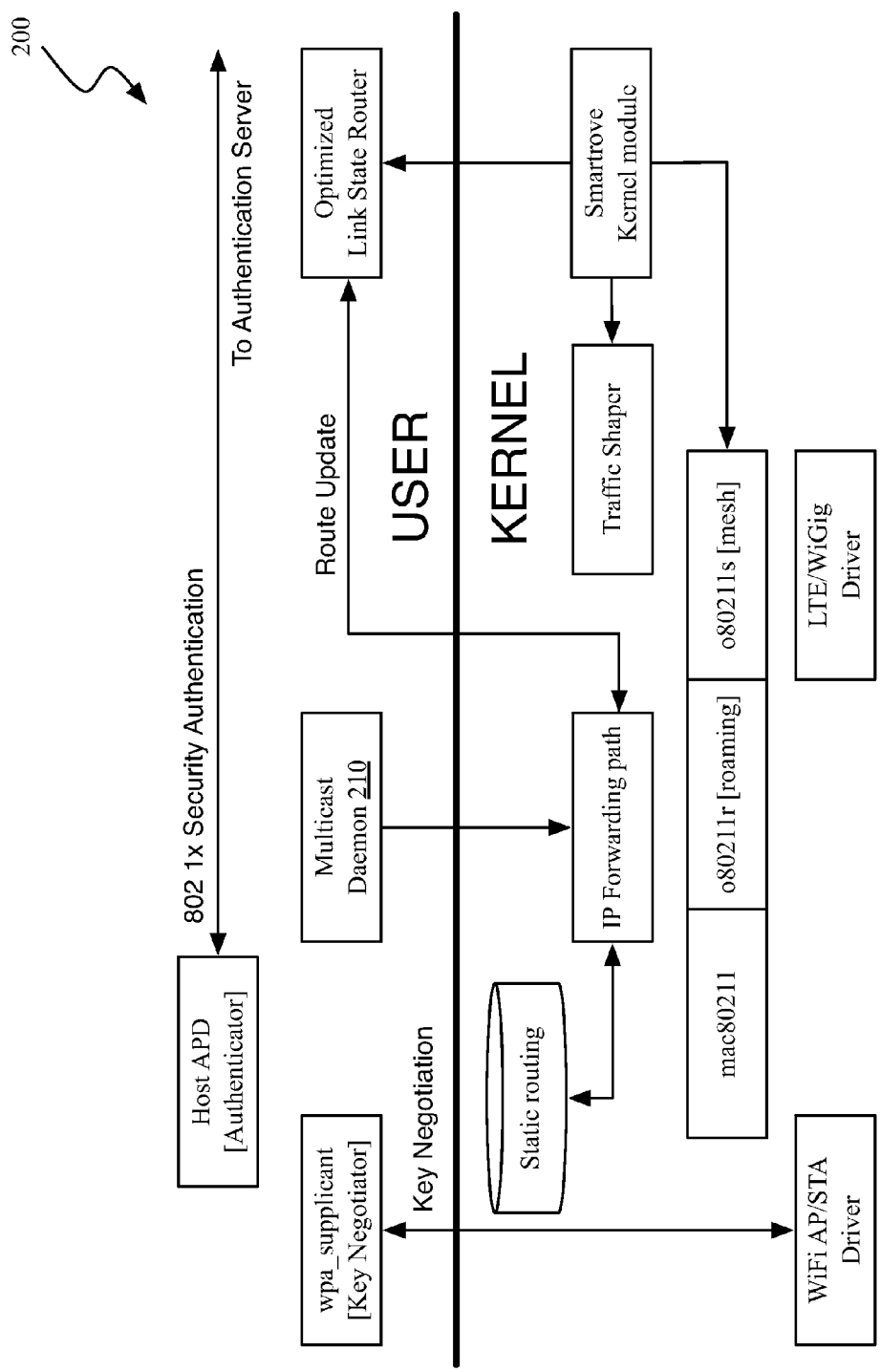
FIG. 2 illustrates a system architecture, in accordance with an embodiment of the present invention.

FIG. 2 illustrates a system architecture 200 including a multicast daemon 210, in accordance with an embodiment of the present invention. Multicast daemon 210 may be configured to enter rules in the IP forwarding layer.

An example operation of multicast traffic flow will now be described. Initially, 4 megabits per second for a multicast group from a server (e.g., in the cloud) to a group of destinations or users may be allowed. After a certain time has elapsed, the bandwidth may be set to nominal levels. This entire sequence can be converted to multicast with traffic shaping rules. The rules may enhance performance within a time period and prevent wasteful use of bandwidth. Further, the rules, which detect and shape the traffic, can be programmatically applied from a management server (e.g., central server 102).

According to one embodiment, a simple management level screen, which prompts a user for server and client addresses results in a propagation of rules to individual nodes in the routed path. Once the multicast packets are flowing from source to destination, the unicast packets that flow can be rate controlled using techniques such as hierarchical token bucket (HTB).

Figure 3:
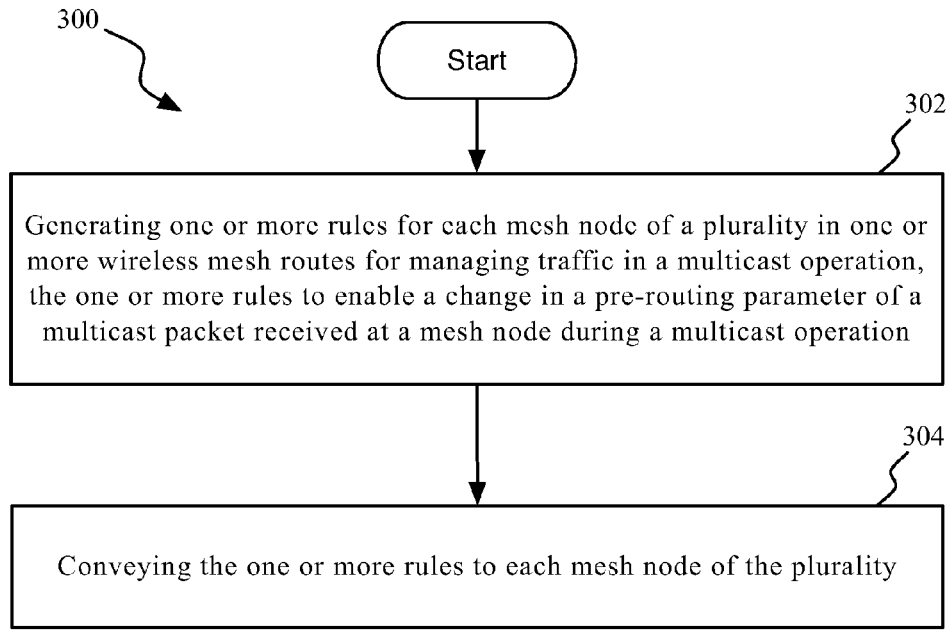
FIG. 3 is a flowchart of a method, according to an embodiment of the present invention.

FIG. 3 is a flowchart of another method 300, in accordance with an embodiment of the present invention. Method 300 includes generating one or more rules for each mesh node of a plurality in one or more wireless mesh routes for managing traffic in a multicast operation the one or more rules to enable a change in a pre-routing parameter in a packet header of a multicast packet received at a mesh node during a multicast operation (act 302). Additionally, method 300 includes conveying the one or more rules to each mesh node of the plurality (act 304).

Figure 4:
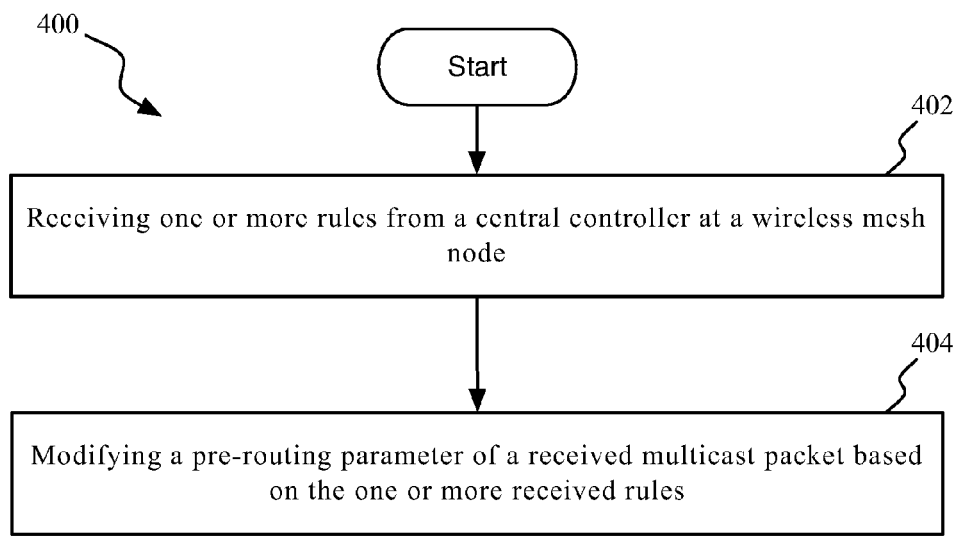
FIG. 4 is a flowchart of another method, according to an embodiment of the present invention.

FIG. 4 is a flowchart of another method 400, in accordance with an embodiment of the present invention. Method 400 includes receiving one or more rules from a central controller at a wireless mesh node (act 402). Additionally, method 400 includes modifying a pre-routing parameter of a received multicast packet based on the one or more received rules (act 404).

According to another embodiment of the present disclosure, a selective TTL adjustment method may use the least CPU bandwidth on the local network processor. The ability to turn multicast flows on or off depending on network directives facilitates better use of network bandwidth. Local or remote storage devices may normally send SSDP packets to a multicast group address on which there could be many content subscribers. The local processor may act as a multicast soft-switch that programs the network interface module to dynamically change the TTL. The local processor may comprise a high performance forwarding engine, but with flow insertion and removals in the order of 100 per second may result in a degradation of performance of up-to 7-10% if an efficient method is not in place. Instead of the normal way of removing the multicast group address, the only TTL is dropped from 128 to 0. The end result is flow re-insertion is faster, and flow removal is also faster. Instead of the typical 7-10% of local processor time, the usage with the technique described here 1%.

Although the foregoing description contains many specifics, these should not be construed as limiting the scope of the invention or of any of the appended claims, but merely as providing information pertinent to some specific embodiments that may fall within the scopes of the invention and the appended claims. Features from different embodiments may be employed in combination. In addition, other embodiments of the invention may also be devised which lie within the scopes of the invention and the appended claims. The scope of the invention is, therefore, indicated and limited only by the appended claims and their legal equivalents. All additions, deletions and modifications to the invention, as disclosed herein, that fall within the meaning and scopes of the claims are to be embraced by the claims.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the systems and methods to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A wireless mesh network, comprising:
a plurality of mesh nodes; and
a central server in communication with the plurality of mesh nodes and configured to:
generate one or more rules for each mesh node of the plurality of mesh nodes in a routing path;
convey the one or more rules to the mesh nodes in the routing path;
change a pre-routing parameter in a packet header of a multicast packet received by a first mesh node of the mesh nodes in the routing path, the change to the pre-routing parameter of the first mesh node based at least in part on the one or more rules received by the first mesh node; and
change a pre-routing parameter in a packet header of a multicast packet received by a second mesh node of the mesh nodes in the routing path, the change to the pre-routing parameter of the second mesh node based at least in part on the one or more rules received by the second mesh node,
wherein at least one of the pre-routing parameters comprises a time-to-live (TTL) parameter that is adjusted at each hop within the routing path of the wireless mesh network according to the one or more rules of the mesh nodes.

2. The wireless mesh network of claim 1, the central server including a rules-based engine configured to generate the one or more rules.

3. The wireless mesh network of claim 2, wherein the rules-based engine is configured to recognize at least one of a media producer or a media consumer.

4. The wireless mesh network of claim 1, wherein at least one of the one or more rules is a traffic shaping rule.

5. The wireless mesh network of claim 1, wherein the central server comprises a multicast daemon configured to generate the one or more rules.

6. The wireless mesh network of claim 1, wherein the central server is configured to sense traffic.

7. The wireless mesh network of claim 1, wherein a netfilter at the one or more mesh nodes is configured to forward or drop a received packet based on the one or more rules.

8. The wireless mesh network of claim 1, wherein the one or more rules enable the TTL parameter to be adjusted at the one or more mesh nodes within a wireless mesh route.

9. A wireless mesh network central controller comprising a rules-based engine, the rules-based engine configured to:
generate one or more rules for each mesh node of the plurality of mesh nodes in a routing path of a wireless mesh network;
convey the one or more rules to the mesh nodes in the routing path;
change a pre-routing parameter in a packet header of a multicast packet received by a first mesh node of the mesh nodes in the routing path, the change to the pre-routing parameter of the first mesh node based at least in part on the one or more rules received by the first mesh node; and
change a pre-routing parameter in a packet header of a multicast packet received by a second mesh node of the mesh nodes in the routing path, the change to the pre-routing parameter of the second mesh node based at least in part on the one or more rules received by the second mesh node,
wherein at least one of the pre-routing parameters comprises a time-to-live (TTL) parameter that is adjusted at each hop within the routing path of the wireless mesh network according to the one or more rules of the mesh nodes.

10. The wireless mesh network central controller of claim 9, the rules-based engine further comprising a multicast daemon configured to generate the one or more rules.

11. The wireless mesh network central controller of claim 9, wherein at least one of the one or more rules is a traffic shaping rule.

12. A method, comprising:
generating one or more rules for each mesh node of a plurality of mesh nodes in a routing path;
conveying the one or more rules to the mesh nodes in the routing path;
changing a pre-routing parameter in a packet header of a multicast packet received by a first mesh node of the mesh nodes in the routing path, the change to the pre-routing parameter of the first mesh node based at least in part on the one or more rules received by the first mesh node; and
changing a pre-routing parameter in a packet header of a multicast packet received by a second mesh node of the mesh nodes in the routing path, the change to the pre-routing parameter of the second mesh node based at least in part on the one or more rules received by the second mesh node,
wherein at least one of the pre-routing parameters comprises a time-to-live (TTL) parameter that is adjusted at each hop within the routing path of the wireless mesh network according to the one or more rules of the mesh nodes.

13. The method of claim 12, further comprising modifying the pre-routing parameter at the one or more mesh nodes in at least one of the one or more wireless mesh routes during the multicast operation.

14. The method of claim 12, wherein modifying the pre-routing parameter comprises modifying a time-to-live (TTL) parameter at the one or more mesh nodes in at least one of the one or more wireless mesh routes during the multicast operation.

15. The method of claim 12, wherein the generating one or more rules comprises generating the one or more rules via a multicast daemon of a central controller of a wireless mesh network including the plurality of mesh nodes.

16. The method of claim 12, wherein conveying comprises conveying the one or more rules from a central controller of a wireless mesh network to the one or more mesh nodes.

* * * * *